(12) United States Patent
Kwon et al.

(10) Patent No.: US 6,363,206 B1
(45) Date of Patent: Mar. 26, 2002

(54) METHOD FOR CONTROLLING TRACKING POSITION DURING LOW-SPEED REPRODUCING IN A VIDEO CASSETTE RECORDER

(75) Inventors: Young-gi Kwon; Jong-gyu Lee, both of Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/115,869

(22) Filed: Jul. 15, 1998

(30) Foreign Application Priority Data

Jul. 15, 1997 (KR) .............................. 97-32748

(51) Int. Cl.[7] .............................................. H04N 5/91
(52) U.S. Cl. .............................. 386/68; 386/72; 386/78
(58) Field of Search .......................... 386/6–8, 68, 72, 386/78–79, 80–81, 87; 360/64, 70, 61, 77.13; H04N 5/91

(56) References Cited

U.S. PATENT DOCUMENTS

| | | | | | |
|---|---|---|---|---|---|
| 5,317,460 A | * | 5/1994 | Kim | .............................. | 386/79 |
| 5,319,499 A | * | 6/1994 | Kim et al. | ..................... | 386/72 |
| 5,327,249 A | * | 7/1994 | Lee | .......................... | 360/77.13 |
| 5,384,642 A | * | 1/1995 | Sim | .......................... | 360/77.13 |
| 5,541,780 A | * | 7/1996 | Han | .............................. | 386/72 |
| 5,677,807 A | * | 10/1997 | Sakai | .......................... | 386/76 |
| 5,684,916 A | * | 11/1997 | Hong | .......................... | 386/68 |
| 6,055,356 A | * | 4/2000 | Park | ............................ | 386/87 |

\* cited by examiner

Primary Examiner—Vincent F. Boccio
(74) Attorney, Agent, or Firm—Dilworth & Barrese, LLP

(57) ABSTRACT

A method for controlling tracking position during low-speed reproducing in a video cassette recorder (VCR) which provides noise suppression noise and increased image quality. In one aspect, in a VCR having a pair of main heads for reproducing video signals from a recording medium at a normal operating speed associated with said VCR, a method for controlling tracking position when reproducing at speeds lower than the normal speed comprises the steps of: detecting a period of an envelope waveform of a video signal which is reproduced by the pair of main heads; generating a pseudo head switching pulse (PHSP) signal in accordance with the detected period; and tracing a tracking position at a position where a voltage level of the envelope waveform is the largest within one period of the PHSP signal.

3 Claims, 6 Drawing Sheets

FIG. 2A  Head switching pulse signal

FIG. 2B  Control signal

FIG. 2C  Envelope waveform

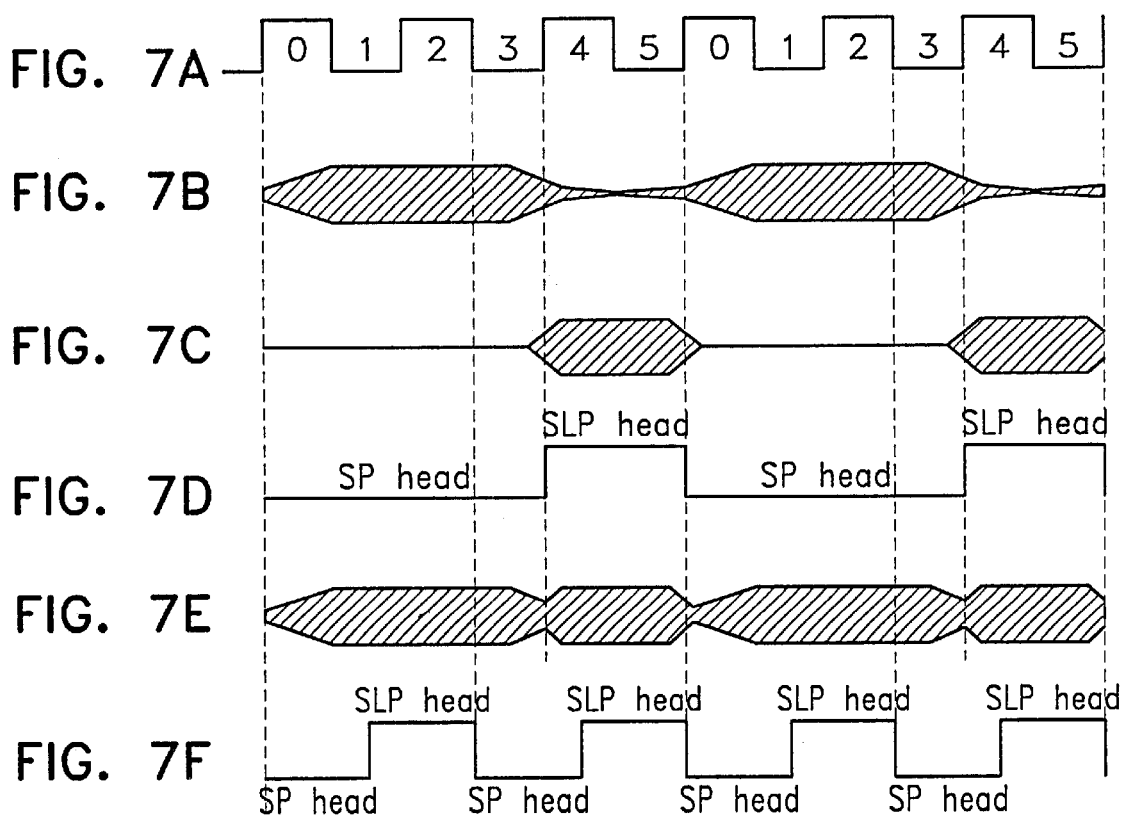

METHOD FOR CONTROLLING TRACKING POSITION DURING LOW-SPEED REPRODUCING IN A VIDEO CASSETTE RECORDER

BACKGROUND

1. Technical Field

The present application relates generally to a method for controlling tracking position during low-speed reproduction of video signals in a video cassette recorder (VCR) and, more particularly, to a method for automatically controlling the tracking position in accordance with a voltage level of an envelope waveform when reproducing at speeds lower than a normal reproduction speed of the VCR.

Additionally, the present method also prevents noise from being generated in a reproduced screen when reproducing a continuous moving image at low speeds to provide an optimally reproduced screen.

2. Description of the Related Art

In general, a conventional video cassette recorder (VCR) is a device which is capable of recording video and audio signals on a recording medium such as a video cassette tape and reproducing these signals from the recording medium. The VCR can reproduce the recorded video signal at various speeds, e.g., normal, low or high speed, or nearly stop reproducing the signal (i.e., display a paused image signal).

Generally, a conventional VCR includes a servo system which is divided into a drum servo for controlling the rotation of a head, and a capstan servo for controlling tracking and maintaining the running speed of the recording medium. Specifically, the capstan servo controls the phase and speed of a capstan motor so that the head which is allocated to each channel can accurately reproduce the video signal of the corresponding channel. The capstan servo also regularly maintains the running speed of the recording medium during recording or reproducing. The rotation speed of the capstan motor is controlled by obtaining a capstan speed error voltage from a capstan frequency generator (CFG) signal corresponding to the running speed of the recording medium. Therefore, during a particular reproducing process such as low-speed reproducing, a temporary stop, or a classifying operation, a step slow signal (i.e., frame-by-frame playback) is outputted from the microcomputer and applied to the capstan motor.

The phase of the capstan motor is controlled by adding the capstan speed error control voltage to a capstan phase error voltage which is obtained by comparing the frequency of a control signal with a reference frequency during the reproduction process.

In a conventional 2-head VCR, a first head (channel 1) and a second head (channel 2) are arrayed at the periphery of a head drum, and face each other 180 degrees apart. In order to enhance the recording density on recording medium, a method for obliquely recording the video signal on the recording medium per unit field is utilized. With this method, the video signal is alternatively recorded in a first field (field 1) corresponding to channel 1 and in a second field (field 2) corresponding to channel 2. The signals in field 1 and field 2 are recorded using an Azimuth recording method in order to prevent the signals from disturbing each other.

When the recording medium is run at a predetermined speed by the capstan motor and the head drum is rotated at a predetermined speed by a spindle motor, the first head reproduces the video signal recorded in field 1 (channel 1) and the second head reproduces the video signal recorded in field 2 (channel 2) according to a head switching pulse (HSP) signal. A video signal of one frame is then reproduced by composing the signals that are recorded in fields 1 and fields 2.

In a conventional 4-head VCR, a first standard play (SP) head and a second SP head (which are the main heads) are arrayed at the outer periphery of the head drum and face each other 180 degrees apart. A first super long play (SLP) head and a second SLP head (which are referred to as sub-heads) are located with respect to each other as much as 180 degrees apart at positions which are separated from the second and first SP heads, respectively. The first and second SLP heads are utilized for variable-speed reproducing.

Referring to FIG. 1, a tracing relation between the field of the video signal recorded on the recording medium and the corresponding head when reproducing at normal speed is shown. FIGS. 2A, 2B and 2C illustrate the relationship between the HSP signal, a control signal and an envelope waveform, respectively, when reproducing at normal speed. In particular, the video signals recorded in field CH1 and field CH2 are reproduced by the heads SP1 and SP2, respectively, according to the HSP signal (shown in FIG. 2A) and the control signal (shown in FIG. 2B). As a result of the periodic HSP and control signals, the envelope waveform of the reproduced video signals for each field is stable and has a constant level (as shown in FIG. 2C).

In a conventional low-speed reproducing method, a stopped (paused) screen is continuously reproduced at irregular intervals by simply rotating the capstan motor with the slow step method. The problem with this method is that the reproduced screen is stopped once per a predetermined period, which causes noise and flickering screens.

To solve this problem, a method for reproducing a continuous moving image at a low speed in a 4-head VCR is disclosed by the present applicant. Referring to FIGS. 3A through 3E, the SP heads and SLP heads are alternatively operated in accordance with a pseudo head switching pulse signal corresponding to the least common multiple of the speed, which enhances the level of the envelope waveform and results in a continuously reproduced image.

In the conventional low-speed reproducing method, since the tracking position is controlled within one period of the HSP signal, it is nearly impossible to decide an optimum tracking position at low-speed reproducing, thereby resulting a reduction in the quality of the reproduced image.

SUMMARY OF THE INVENTION

The present application is directed to a method for controlling a tracking position during low-speed reproducing in a conventional 4-head VCR in order to obtain an optimally reproduced image.

In one aspect, in a VCR having a pair of main heads for reproducing video signals from a recording medium at a normal operating speed associated with said VCR, a method for controlling tracking position when reproducing at speeds lower than the normal speed comprises the steps of:

- detecting a period of an envelope waveform of a video signal which is reproduced by the pair of main heads;
- generating a pseudo head switching pulse (PHSP) signal in accordance with the detected period; and
- tracing a tracking position at a position where a voltage level of the envelope waveform is the largest within one period of the PHSP signal.

Preferably, the period indicates the number of the head switching pulses corresponding to the least common multiple of the speed to be reproduced.

These and other objects, features and advantages of the present application will become apparent from the following detailed description of illustrative embodiments, which is to be read in connection with the accompanying drawings.

BRIEF DESCRIPTION OF THE DRAWINGS

FIGS. 3A to 3E are waveforms formed when reproducing at a low speed of 2/3 normal speed, wherein:

FIG. 3A is a waveform of a head switching pulse signal;

FIG. 3B is an envelope waveform of a video signal which is reproduced by SP heads;

FIG. 3C is an envelope waveform of a video signal which is reproduced by SLP heads;

FIG. 3D is a waveform of a pseudo head switching pulse signal for selecting between SP heads and SLP heads; and FIG. 3E is a composed envelope waveform;

FIGS. 7A to 7F are waveforms formed when reproducing at a low speed of 2/3 normal speed, wherein:

FIG. 7A is a waveform of the head switching pulse signal;

FIG. 7B is an envelope waveform of a video signal which is reproduced by SP heads;

FIG. 7C is an envelope waveform of a video signal which is reproduced by SLP heads;

FIG. 7D is a waveform of a pseudo head switching pulse signal for selecting the SP heads and SLP heads;

FIG. 7E is a composed envelope waveform; and

FIG. 7F is a waveform of the pseudo head switching pulse signal for controlling the tracking position.

DETAILED DESCRIPTION OF PREFERRED EMBODIMENTS

Figure 1:
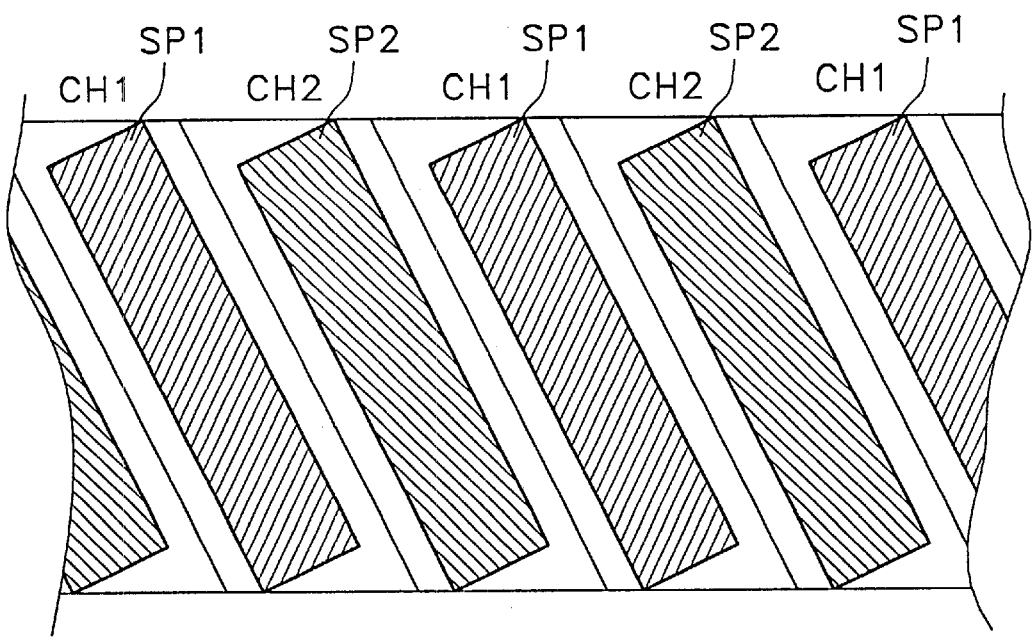
FIG. 1 is a schematic representation of the tracing relation between a field of a video signal recorded on a recording medium and a corresponding head when reproducing at a normal speed.
Figure 2:
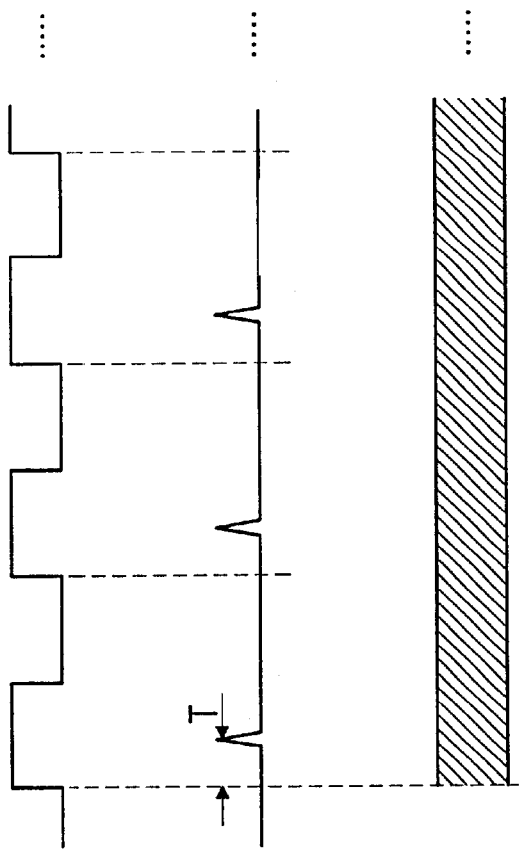
FIGS. 2A, 2B and 2C are timing diagrams illustrating the relationship between a head switching pulse signal, a control signal and an envelope waveform, respectively, when reproducing video signals at a normal speed as shown in FIG. 1.
Figure 3:
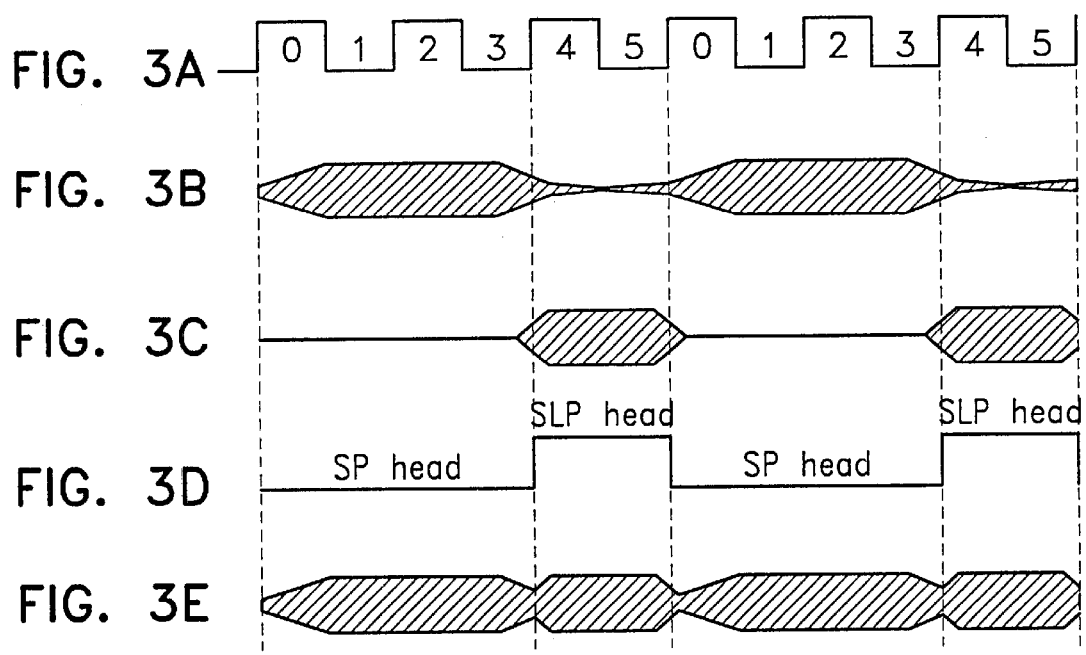
Figure 4:
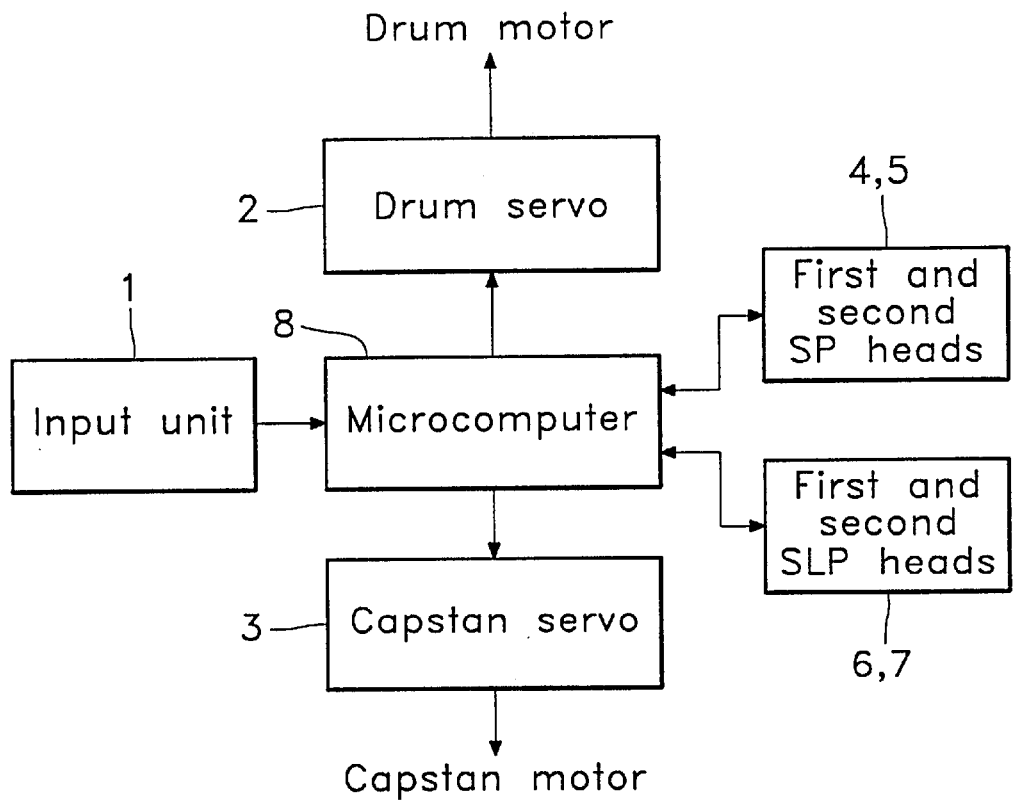
FIG. 4 is a block diagram of a conventional VCR in which a method for controlling the tracking position at low-speed reproducing may be implemented.

Referring now to FIG. 4, a block diagram is shown of a VCR in which the present method may be utilized. An input unit 1 includes a plurality of keys for selecting either normal-speed reproducing or variable speed reproducing. A drum servo 2 controls the rotation of a drum motor so that head rotation speed can be maintained at a prescribed speed.

A capstan servo 3 controls the phase and speed of a capstan motor so that a head associated with a given channel can accurately reproduce a video signal from the channel. In addition, the capstan servo 3 maintains a recording medium at a constant running speed when reproducing or recording the video signal. A microcomputer 8 generates a HSP signal for the first and second SP heads 4 and 5, as well as the first and second SLP heads 6 and 7. In addition, as explained in further detail below, the microcomputer 8 outputs a pseudo head switching pulse (PHSP) signal in accordance with the regularity (i.e., period) of an envelope waveform of a video signal reproduced by the first and second SP heads 4 and 5.

Figure 5:
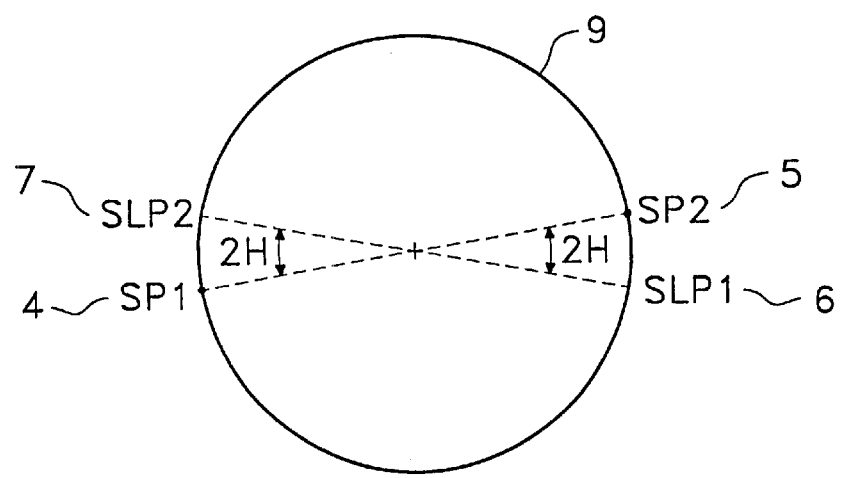
FIG. 5 is a schematic diagram illustrating the layout of heads in a head drum of a 4-head VCR.

Referring now to FIG. 5, a schematic diagram illustrates a layout of the SP heads (4 and 5) and the SLP heads (6 and 7) in a head drum 9 mounted on a 4-head VCR. As shown, the first SP head 4 and the second SP head 5 are positioned at the periphery of the head drum 9 and disposed 180 degrees from each other. In addition, the first SLP head 6 and the second SLP head 7 are located with respect to each other as much as 180 degrees apart at positions which are separated from the second SP head 5 and the first SP head 4, respectively.

Figure 6:
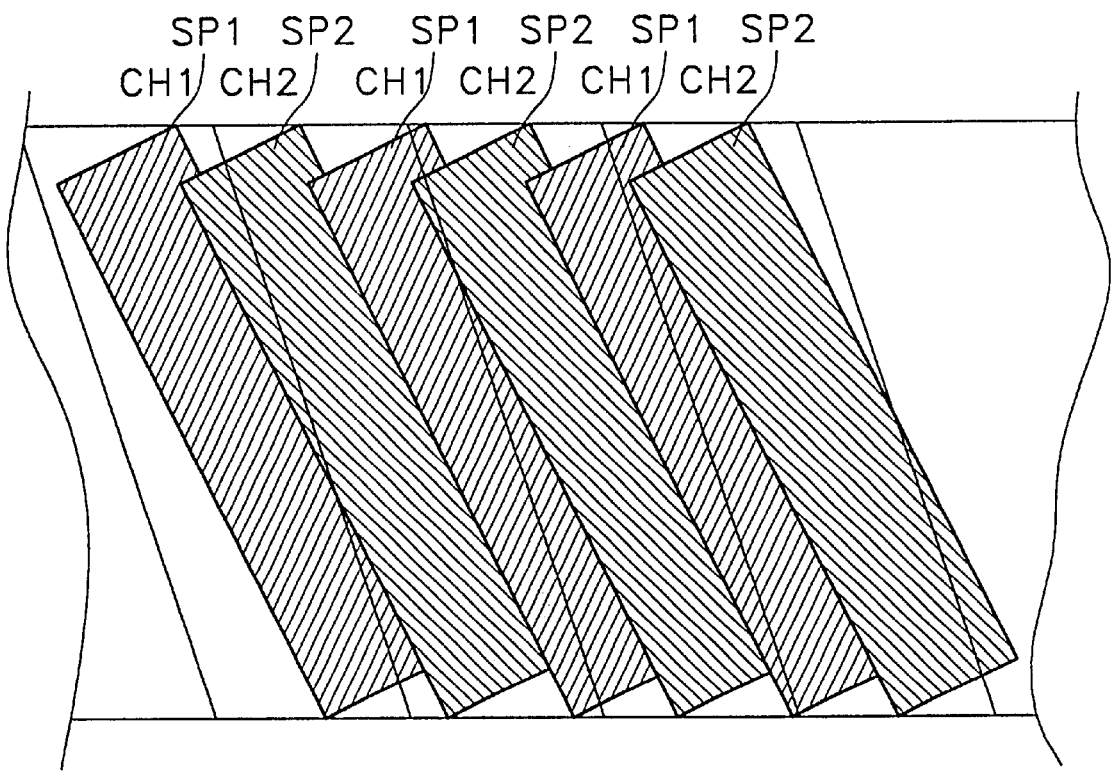
FIG. 6 is a schematic representation of the tracing relation between a field of a video signal recorded on a recording medium and a corresponding head when reproducing at a low speed of 2/3 normal speed.

The present method of controlling tracking position during low-speed reproduction of the video signal from the recording medium will now be explained with reference to FIGS. 6 and 7. In particular, FIG. 6 is a schematic representation of a tracing relation between a video signal field on a recording medium and the first and second SP heads 4 and 5, respectively, when reproducing at 2/3 normal speed. During reproduction, the capstan motor is rotated at 2/3 normal speed, while the drum motor is rotated at normal speed. Accordingly, the recording medium is transported at the lower speed (i.e., 2/3 normal speed), and the first SP head 4 and the second SP head 5 reproduce the recorded video signal by alternatively tracing the corresponding field (i.e., CH1 and CH2) of the recording medium (as shown in FIG. 6) in accordance with the HSP signal shown in FIG. 7A.

The resulting waveform (as shown in FIG. 7B) is an envelope waveform of a video signal which is reproduced by the first and second SP heads 4 and 5, respectively. Since each SP head simultaneously traces both the relevant track and its neighboring track during low-speed reproducing, the resulting envelope waveform has a regularly repeating pattern (i.e., period) of approximately six (6) head switching pulses (which is the least common multiple of the relevant speed, i.e., 2/3 ), which is repeatedly detected.

In sections of the resulting envelope waveform where four head switching pulses (i.e., pulses 0–3 in FIG. 7A) are generated, the envelope waveform is detected above a reference value, which results in a reproduced image that is capable of being viewed with insignificant noise interference. On the other hand, in sections of the resulting envelope waveform where the remaining two head switching pulses are generated (i.e., pulses 4–5 in FIG. 7A), the envelope waveform is detected below the reference value, which results in a reproduced image that is incapable of being viewed due to significant levels of noise interference.

Referring to FIG. 7C, an envelope waveform of a video signal which is reproduced by the SLP heads 6 and 7 is shown. As shown, when the first SLP head 6 and the second SLP head 7 (which neighbor the second SP head 4 and the first SP head 4, respectively) are operated, the resulting envelope waveform shown in FIG. 7C is complementary to the envelope waveform of FIG. 7B.

Referring now to FIG. 7D, a waveform of the PHSP signal for selecting between the SP heads and SLP heads is shown. The microcomputer 8 outputs the PHSP signal (FIG. 7D) in order to selectively detect the envelope waveform (FIG. 7C) when it is above the reference value. The resulting envelope waveform shown in FIG. 7E is produced by combining and composing the envelope waveform produced by the SP heads 4 and 5 (FIG. 7B) and the envelope waveform produced by the SLP heads 6 and 7. (FIG. 7C). The combination of these waveforms results in the reproduction of a continuous moving image in which the noise is excluded.

Referring now to FIG. 7F, a waveform is shown of a PHSP signal for controlling the tracking position in accordance with the present method. In particular, in order to control the tracking position, a pseudo HSP signal of one period having the same duty ratio of the HSP signal in FIG. 7A is required. In other words, one period of the HSP signal of FIG. 7A has a positive region where the first SP head 4 is operated and a negative region where the second SP head 5 is operated. In the present method, the first SP head 4 and the second SP head 5 reproduce the recordable medium during the same time, and one frame is made by combining the reproduced signals from the first and second SP heads. Accordingly, the microcomputer 8 generates the PHSP signal (FIG. 7F) which is delayed by 2/3 normal speed, and the control pulse signal is detected at positions where a predetermined time T elapses from a positive edge of the PHSP signal. Since it relates to the tracing position of the head which can reproduce the video signal recorded in the relevant track at an optimum state, the control pulse signal traces a position having the largest level of the envelope waveform within one period of the PHSP signal, thereby detecting an optimum tracking position.

As described above, the present invention is not limited to a method for reproducing at a speed of 2/3 of the normal speed. It is widely applicable to all reproduction speeds lower than normal speed.

In summary, in the present method for controlling tracking position during low speed reproduction of the VCR, the relevant period of the envelope waveform of the first and second SP heads is detected. The PHSP signal is generated in accordance with the detected period to control the tracking position, and the optimum tracking position is detected within one period of the PHSP signal, thereby suppressing noise and preventing poor image quality.

Although the illustrative embodiments of the present application have been described herein with reference to the accompanying drawings, it is to be understood that the application is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. In a video cassette recorder (VCR) having a pair of main heads, a method for controlling tracking position when video signals from a recording medium are reproducing at speeds lower than a normal speed, comprising the steps of:

generating an envelope waveform of the video signals which is reproduced by said pair of main heads;

detecting a period of the envelope waveform;

generating a pseudo head switching pulse (PHSP) signal in accordance with said detected period; and tracing a tracking position at a position where a voltage level of said envelope waveform is the largest within one period of said PHSP signal;

wherein said period of said envelope waveform corresponds to a plurality of head switching pulses, which is determined by the value of the least common multiple of producing speed ratio.

2. An apparatus, when video signals from a recording medium are reproducing at speeds lower than a normal speed in a video cassette recorder (VCR), for controlling tracking position, a apparatus comprising:

means for generating an envelope waveform from video signals reproduced from said recording medium by a pair of main heads;

means for determining a period of said envelope waveform;

means for generating a pseudo head switching pulse (PHSP) signal in accordance with said determined period; and means for tracing a tracking position at a position where said envelope waveform has the largest voltage level within one period of said PHSP signal;

wherein said period of said envelope waveform is determined by a number of head switching pulse signals corresponding to the value of the least common multiple of reproducing speed ratio.

3. In a video cassette recorder (VCR) including a pair of main heads and a pair of sub heads, a method for controlling tracking position when video signals from a recording medium are reproducing at speeds lower than a normal speed, comprising the steps of:

generating an envelope waveform of the video signal which is reproduced by said pair of main heads and said pair of sub heads;

detecting a period of the envelope waveform;

generating a pseudo head switching pulse (PHSP) signal in accordance with said detected period; and tracing a tracking position at a position where a voltage level of said envelope waveform is the largest within one period of said PHSP signal;

wherein said period of said envelope waveform is the same as the number of a plurality of head switching pulses, which corresponds to the value of the least common multiple of numerator and denominator of a reproducing speed which is a lower speed than normal speed.

* * * * *